April 26, 1955 L. E. NORTON 2,707,233

FREQUENCY STABILIZATION

Original Filed May 28, 1948 2 Sheets-Sheet 1

INVENTOR
Lowell E. Norton
BY J. L. Whittaker
ATTORNEY

INVENTOR
Lowell E. Norton
BY
J. L. Whittaker
ATTORNEY

United States Patent Office 2,707,233

Patented Apr. 26, 1955

2,707,233

FREQUENCY STABILIZATION

Lowell E. Norton, Princeton, N. J., assignor to Radio Corporation of America, a corporation of Delaware Continuation of application Serial No. 29,836, May 28, 1948. This application July 16, 1951, Serial No. 236,945

The terminal 15 years of the term of the patent to be granted has been disclaimed 2 Claims. (Cl. 250—36)

The instant application is a continuation of applicant's copending but now abandoned application Serial Number 29,836, filed May 28, 1948, entitled "Methods and Systems for Stabilizing the Frequency of Oscillators."

This invention relates to methods and systems for stabilizing the frequency of oscillators produced by tube-generators, particularly klystrons, magnetrons and like microwave tubes.

In accordance with the invention, the difference in phase between oscillations non-concurrently produced by the oscillator to be stabilized is utilized to produce a control effect which is directly or indirectly applied to the oscillator to minimize variation of the aforesaid phase-difference.

More specifically, in some forms of the invention, the oscillations produced by the oscillator to be stabilized are transmitted through two paths, at least one of which includes a delay circuit, to a phase-comparator whose output is applied to an electrode of the oscillator tube or of a reactance tube associated therewith; in other forms of the invention, the non-concurrently produced oscillations impressed upon the phase-comparator are jointly produced by the oscillator to be stabilized and a second oscillator. The outputs of the two oscillators are impressed upon a mixer circuit for generation of a beat-frequency which is transmitted through two paths having different time-delay characteristics to the phase-comparator whose output is used to vary the potential of an electrode of the oscillator to be stabilized or of the associated reactance tube.

The invention further resides in methods and systems having novel features hereinafter described and claimed.

For a more detailed understanding of the invention and for illustration of various modifications thereof, reference is made to the accompanying drawings in which.

Figures 1, 2, 3:
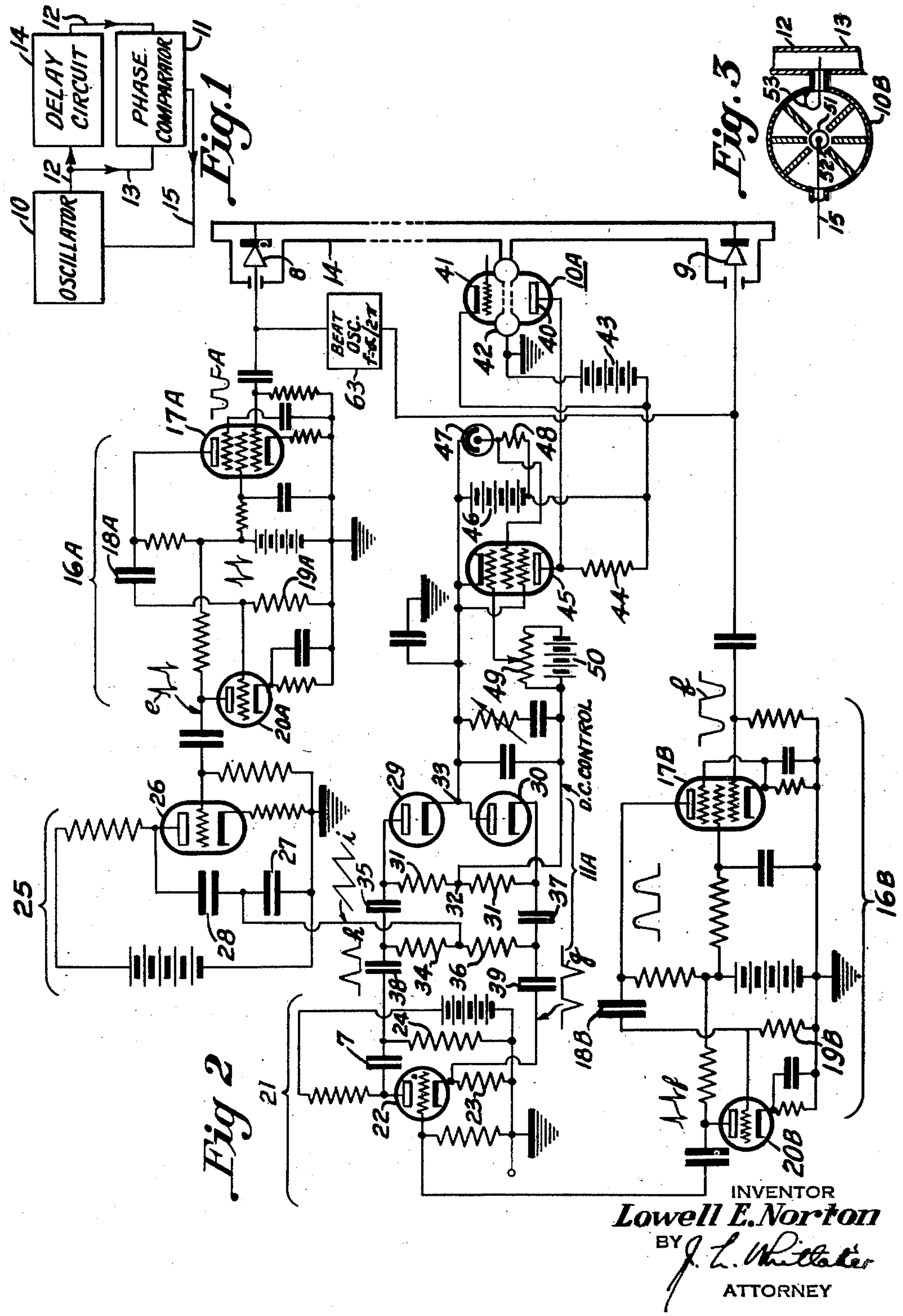
Figure 1 is a block diagram of the basic frequency stabilizing system.
Figure 2 is a schematic diagram of a particular embodiment of the system of Figure 1.
Figure 3 illustrates a magnetron with an auxiliary field-control electrode.

Referring to Figure 1, the output of oscillator 10 is impressed upon a phase-comparator 11 through two paths 12 and 13 having different time-delay characteristics. At least one of the paths includes a delay circuit 14 so that oscillations respectively applied by lines 12 and 13 to the input circuits of the comparator are actually non-concurrently produced by oscillator 10. Specifically with the particular arrangement shown in Figure 1, using a single delay-circuit, the phase of oscillations being generated by oscillator 10 is continuously compared with the phase of oscillations generated by the same oscillator at an earlier time corresponding with the delay interval introduced by circuit 14.

The phase-comparator produces a unidirectional "error" voltage whose algebraic sign depends upon the sense of any phase shift (with corresponding frequency shift, since frequency is the time rate of phase shift) that has occurred in the time interval corresponding with the delay introduced by circuit 14 and whose magnitude corresponds with the extent of the phase shift. When the oscillator tube is of the type having an electrode whose potential may be varied to change the frequency of the generated oscillations, the "error" voltage may be used directly to vary the potential of the frequency-determining electrode; when the oscillator is of the feedback type, the "error" voltage may be applied to a reactance tube associated with the oscillator so to compensate for frequency-drift of the oscillator.

If the frequency of the controlled oscillator is very high, it is advisable to employ a common beating oscillator 63 to reduce the compared frequencies in the two channels of the phase comparator.

Figures 5, 6, 6A:
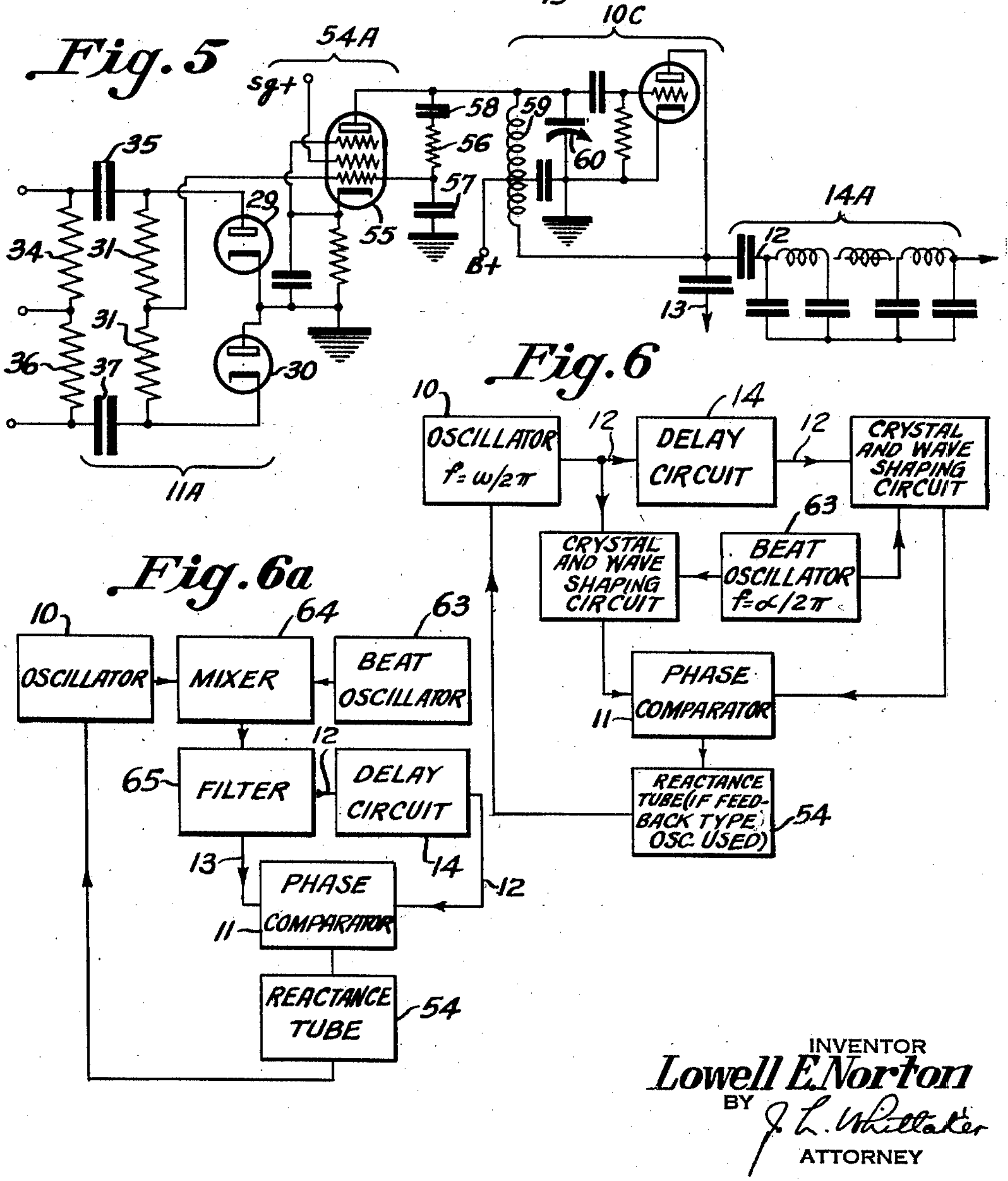
Figure 5 is a schematic diagram of a particular embodiment of the system of Figure 4.
Figures 6 and 6*a* are block diagrams of other modifications of the system shown in Figure 1.

In Figures 2 and 6, the phase $\phi_1$ of the output voltage of the oscillator as impressed by line 13 upon phase-comparator 11 after application of beating oscillator 63 voltage may be expressed as:

(1) $$\phi_1=(\omega_0-\gamma)t+\psi \sin pt$$

and the phase of the output voltage as delayed by circuit 14 and impressed by line 12 on the phase-comparator after application of the same beating oscillator voltage may be expressed as:

(2) $$\phi_2=(\omega_0-\gamma)t-\omega T+\psi \sin [p(t-T)]$$

where $\omega_0$ is the initial constant phase velocity; $\gamma$ is the beating oscillator phase velocity, $\psi$ is the phase shift angle; T is the delay time of circuit 14 and $p$ is the phase variation rate.

The phase difference $\Delta\psi=\phi_1-\phi_2$ determined by the phase-comparator is therefore (3) $$\Delta\phi=\omega_0 T+2\psi \sin pT/2 \cos [p(t-T/2)]$$

The first term ($\omega_0$T), is a constant fixed by the chosen parameters of the delay circuit and so the term from which the "error" voltage is produced by the comparator is:

(4) $$\Delta\psi a=2\psi \sin pT/2 \cos [p(t-T/2)]$$

It is apparent that the beating oscillator of frequency $\gamma/2\pi$ is common to both channels. It cannot introduce differential phase shift and so need only have moderate frequency stability.

Since the factors which are likely to cause change in frequency of the oscillator are thermal effects, hum voltages, mechanical shock and the like, and since the delay time T is small, of the order of microseconds, then:

(5) $$\sin pT/2 \cong pT/2$$

and consequently:

(6) $$\Delta\phi a=p\psi T \cos [p(p+T/2)]$$

The maximum value of the term $\Delta\phi\alpha$ is $p$T and assuming the phase detector responds to a 0.1 degree phase shift then:

(7) $$p\psi=\pi/1800T$$

assuming shift from the initial phase (Equation 1) of of the oscillator, the oscillator output is impressed by line 13 on the comparator may be expressed as:

(8) $$e_1=E_1 \sin (\omega_0 t-\psi \cos pt)$$

If, for example, the delay time T is one microsecond, then from Equations 7 and 8, it appears that the maximum frequency deviation ($p\psi$) is 278 cycles per second at the carrier frequency $$\frac{\omega_0}{2\pi}$$

Thus even at frequencies of the order of kilomegacycles, the full output of the phase-comparator may be developed for frequency deviations of less than one kilocycle and consequently the frequency of microwave oscillators may be rigidly controlled.

As illustrative of a particular system utilizing the method of stabilization above discussed in connection with Figure 1, reference is made to Figures 2 and 6 in which the oscillator to be stabilized is a klystron 10A generating oscillations whose wavelength may be of the order of centimeters. Part of the output of the klystron is transmitted through a delay line 14 which may be a suitable length of concentric cable, waveguide, a delay network or the like so that assuming the oscillator tends to drift in phase, there is appreciable phase difference between the oscillations currently being produced by the oscillator and those at the far end of the delay line.

The delayed oscillations are rectified by the crystal 8, or equivalent rectifier, which also serves as a mixer for the beat oscillator 63 of frequency $f=\gamma/2\pi$, and impressed upon a wave-shaping circuit 16A. The flat-topped impulses (*a*) impressed upon the input circuit of tube 17A are amplified, reversed in polarity and impressed upon a differentiator network comprising condenser 18A and resistor 19A to apply to the grid of tube 20A a double pulse for each input pulse (*a*). The resulting output of tube 20A is a series of sharp pulses (*e*) each having a steep slope at the center of the corresponding impulses (*a*) to the grid of tube 17A. The grid-cathode bias of tube 20A is such that with an anode resistance of high value, the anode of tube 20A is only slightly above cathode potential, consequently the first swing of the grid potential of tube 20A produces little change in anode potential whereas the second one immediately following causes a steep positive swing.

In similar manner, the oscillations being currently produced by the oscillator 10A are rectified by crystal rectifier 9, which also serves as a mixer for the same beat oscillator of frequency $f=\gamma/2\pi$, or equivalent, and impressed upon amplifier-differentiator 16B to produce a series of sharp output pulses (*f*), each having a steep rise at the center of the corresponding input pulse (*b*) to tube 17B. The corresponding elements of the two differentiator amplifiers are identified by the same reference characters with different letter suffixes.

The output pulses (*f*) of the amplifier-differentiator 16B are applied to the push-pull impulse-generator 21 to produce two trains of pulses of the same repetition frequency as pulses (*f*), the corresponding pulses of the two trains being concurrent in time and opposite in polarity. The particular form of impulse generator shown in Figure 2 utilizes a gas triode 22 to whose grid the pulses (*f*) are applied. However, at higher operating frequencies it is essential to use a vacuum tube impulse generator. Negative pulses (*g*) appear across the cathode resistor 23 of tube 22 and positive output pulses (*h*) appear across resistor 24 connected to the anode of the tube by condenser 7 and to the cathode of the tube by resistor 23.

The output pulses (*e*) of the amplifier-differentiator 16A for the delayed oscillations are applied to the saw-tooth wave generator 25 so that for each input pulse (*e*) there is produced a saw-tooth output pulse (*i*) having a linear rise and an abrupt decay. In the particular form of saw-tooth generator shown in Figure 2, the input pulses (*e*) are applied to the grid of a tube 26 to produce across capacitor 27, which is in series with capacitor 28 between the anode and cathode of the tube, a series of saw-tooth pulses (*i*) having the same repetition rate as the delayed oscillations.

The sense and extent of variation of the oscillator frequency is determined by impressing the pulses *g, h, i,* upon a phase-comparator which in the particular system shown in Figure 2 comprises a pair of diodes 29, 30 or equivalent rectifiers. The positive and negative pulses (*g*) and (*h*) derived by amplifier-differentiator 16B and impulse-generator 21 from the oscillations currently produced by oscillator 10A are respectively applied to the cathode of rectifier 30 and to the anode of rectifier 29. The anode of rectifier 29 is connected to the cathode of rectifier 30 by resistors 31, 31 whose common terminal 32 is one of the output terminals of the comparator 11A; the other electrodes of these rectifiers are connected to the other output terminal 33 of the comparator. The pulses (*i*) derived by amplifier-differentiator 16A and saw-tooth generator 25 from the delayed oscillations are applied to the anode of rectifier 29 through resistor 34 and condenser 35 and to the cathode of rectifier 30 through resistor 36 and condenser 37. There is thus produced across the output terminals 32 and 33 of the comparator a unidirectional voltage which is of one sense when the pulses (*g*) and (*h*) advance in phase with respect to the saw-tooth pulses (*i*) and which is of opposite sense when the pulses (*g*) and (*h*) are lagging with respect to their normal phase relation to pulses (*i*). So far as the phase comparator is concerned, it shall, of course, be understood that the connections from the rectifiers 8 and 9 to the differentiator amplifiers 16A and 16B may be interchanged. In either event, the unidirectional output of the comparator varies in accordance with variation of the phase difference between oscillations non-concurrently produced by the klystron 10A.

The D. C. control voltage produced by the comparator may be used to vary the potential of the reflector-anode of the klystron 10A in a sense compensating for instability in frequency of its generated oscillations. A fixed D. C. voltage difference between the cathode 41 and the output cavity of the klystron 10A is maintained by a stable or stabilized supply generically represented by battery 43. The voltage difference between the reflector-anode 40 and the cathode 41 of the klystron depends upon the IR drop across resistor 44 which is connected between the anode of the regulator tube 45 and the positive terminal of the source of stabilized D. C. voltage generically represented by battery 46. Glow discharge tube 47 and current-limiting resistor 48 maintain the screen-cathode potential of tube 45 at a constant value. The magnitude of the current through resistor 44 and therefore the frequency-determining potential of reflector-anode 40 depends upon the biasing voltage applied to the grid of regulator tube 45. One component of this biasing voltage may be of fixed magnitude selected by adjustment of potentiometer 49 supplied from battery 50 or other suitable source. The other component of this biasing voltage is the "error" output voltage of the comparator 11A as appearing between its output terminals 32, 33.

Generally the same arrangement may be used for stabilizing the frequency of a magnetron. The "error" voltage produced by the phase-comparator 11A may be applied to the field-grid 51 of the magnetron 10B, Figure 3, to vary the unidirectional electrostatic field in the space between the cathode 52 of the magnetron and the associated anode vanes or equivalent. The magnetron may be coupled, in any conventional manner as by loop 53, to a waveguide having branches 12 and 13 extending to the phase-comparator and at least one of which is provided with, or itself forms, a time-delay circuit for phase-comparison purposes above-explained.

Figure 4:
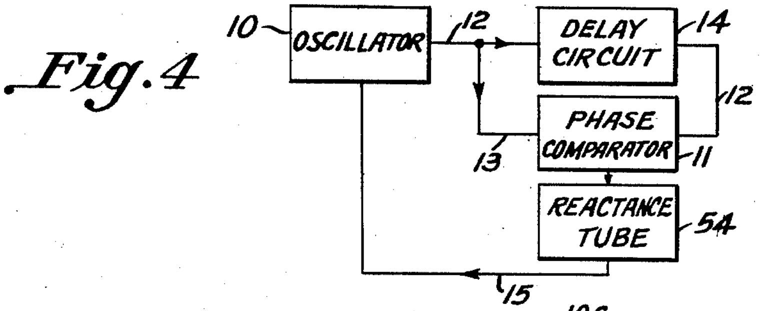
Figure 4 is a block diagram of a modification of Figure 1.

When the oscillator is of the feed-back type, the basic system of Figure 1 may be modified, as shown in Figure 4, to include a reactance tube 54, to which the "error" voltage produced by the phase-comparator is applied for control of the oscillator frequency. If the oscillator frequency is not too high the circuit of Figure 4 is used. If the frequency is so high that the wave shaping circuits and phase comparator become inoperative, then the beating oscillator arrangement of Figure 6 or Figure 6*a* should be used. As illustrative of a particular arrangement using this modification, reference is made to Figure 5 in which the output voltage of a phase-comparator, for simplicity of the same type shown in Figure 2, is applied to the control grid of pentode 55 of the reactance tube network 54A. A phasing-network comprising resistor 56 and condenser 57 is connected between the anode and cathode of the tube with a connection from the control grid of tube 55 to a point between them. The blocking condenser 58 isolates the control grid from the direct-current voltage of the anode. The phasing network 56, 57 is also connected across the frequency-determining circuit 59, 60 of oscillator 10C. As well understood by those skilled in the art, the tube 55 appears to the tuned circuit 59, 60 of the oscillator as an inductive reactance whose magnitude varies with variation of the grid bias of the reactance tube 55.

As in the preceding modifications, the output of the oscillator 10C is fed to the comparator 11A through two paths 12 and 13, one of which includes a delay line represented in Figure 5 by a network 14A having a plurality of inductance-capacitance sections, which may be replaced by a time-delay line whose distributed inductance and capacitance afford the desired time delay.

As has been indicated earlier, when the oscillator frequency is so high that it is difficult to design a satisfactory phase-comparator, recourse may be had to the arrangement shown in Figure 6 or Figure 6*a* which utilizes an additional microwave oscillator 63 for producing a difference-frequency low enough to insure efficient operation of the phase-comparator. Specifically, as shown in Figure 6*a*, the outputs of oscillators 10 and 63 are impressed upon a mixer 64 of any suitable type including a crystal, a diode or other rectifier. The filter 65 in the output circuit of the mixer 64 selects the lower side-band frequency and transmits these oscillations jointly produced by oscillators 10 and 63 through paths 12 and 13 to the phase-comparator 11. At least one of these paths, as in the preceding modifications, includes a delay circuit 14 for comparison of the phase of non-concurrently produced oscillations. As the beat oscillator supplies both paths to the phase-comparator circuit, it is not necessary that it be stabilized.

As previously stated, Fig. 6 represents in block diagram form the circuit of Fig. 2. It is believed that this relation is obvious and therefore further explanation of Fig. 6 is thought to be unnecessary.

From Equation 7 above, it is evident that to obtain effective compensation for small frequency deviations the delay time afforded by network 14 should be long. As the delay time for any network depends upon the slope of its phase-frequency characteristic, the band width of the delay circuit should be narrow if large and complicated delay structures are to be avoided. If the delay circuit is a single sharply resonant element, such as a resonant chamber or a single inductance-capacitance section, the delay is:

$$T=\frac{\gamma\beta}{\gamma\omega}=\frac{1}{2\Delta f}\text{ seconds} \tag{9}$$

if the band width $\gamma\beta$ is expressed in cycles per second. Additional delay may be obtained by cascading a suitable number of sections or elements, each of narrow band width.

I claim as my invention:

1. An absolute frequency stabilizing system comprising a single oscillator, a delay line coupled directly to the output of said oscillator and receptive of oscillatory energy produced by said oscillator alone, said delay line providing a delay of a substantial number of cycles at the operating frequency, a phase-comparator having a pair of inputs one coupled to the output of said delay line and the other coupled directly to the oscillator, and means for applying only the time-dependent output of said phase-comparator to said oscillator to minimize variation of the phase difference between the respective oscillations supplied to the pair of inputs of said comparator.

2. A stabilizing system in accordance with claim 1, wherein said single oscillator comprises a tube having an electrode whose unidirectional potential determines the frequency of the generated oscillations, wherein said comparator operates to produce a unidirectional potential of magnitude dependent upon the time-dependent phase difference between the respective oscillations supplied to the pair of inputs of said comparator, and wherein the potential produced by said phase-comparator is applied to said electrode of the oscillator tube.

References Cited in the file of this patent

UNITED STATES PATENTS

| | | |
|---|---|---|
| 2,065,565 | Crosby | Dec. 29, 1936 |
| 2,256,083 | George | Sept. 16, 1941 |
| 2,408,079 | Labin et al. | Sept. 24, 1946 |